INVENTORS
FREDERICK R. HASELTON
KARL H. KELLER

INVENTORS
FREDERIC R. HASELTON
KARL H. KELLER ated June 17, 1969

United States Patent Office 3,450,083
SUBMARINE HYDRODYNAMICS CONTROL SYSTEM
Frederick R. Haselton, Williamsville, N.Y., and Karl H. Keller, Arnold, Md., assignors to the United States of America as represented by the Secretary of the Navy
Filed Apr. 29, 1968, Ser. No. 724,892
Int. Cl. B63h 25/42, 5/06
U.S. Cl. 114—16      7 Claims

ABSTRACT OF THE DISCLOSURE

An improved system, including a fore and after movable spherical bearing surface, for supporting a movable wobble plate ring which controls the collective and cyclic (selective) pitch of a plurality of propeller blades carried by rings rotating aroud the circumference of the hull of a submersible vessel having tandem mounted counter-rotating propulsion systems.

---

The invention described herein may be manufactured and used by or for the Government of the United States of America for governmental purposes without the payment of any royalties thereon or therefor.

BACKGROUND OF THE INVENTION

The present invention relates to a propulsion and control system for a submersible vehicle capable of maneuvering in a fluid medium and more particularly to the collective and cyclic (selective) pitch variation of the propelling blades. The system represents an improvement in the patent to F. R. Haselton, Patent No. 3,101,066, and comprises an improved system for supporting the wobble plate ring which controls the collective and cyclic pitch of the plurality of propeller blades.

Propulsion of submersible vessels in the prior art employing counter-rotating tandem mounted propeller blade systems is well known, as well as the means for controlling pitch of the propeller blades carried by the rotating ring at the circumference of the hull. The difficulties with the prior art systems may be understood when it is realized that the wobble plate ring must be moved forward and aft in line with the axis of rotation of the ring upon which the propellers are mounted and also must be moved at an angle or tilted to the axis of rotation of the ring. In other words, the wobble plate rings must be "floating" to provide for cyclic (selective) and collective pitch. Prior art systems, including Haselton Patent No. 3,101,066, have "floated" this ring on elastic mounts such as, for example, rubber or steel springs to permit freedom of movement when the actuators push and pull the ring along the axis of rotation and when the ring is angled to the axis of rotation. The systems were subject to disadvantages of lack of durability and much lost motion.

SUMMARY

The present invention provides a more secure foundation and bearing surface upon which the "floating" wobble plate ring may ride when moved to provide for both collective and cyclic (selective) pitch of the plurality of propellers mounted on the rotating ring at the circumference of the hull. Furthermore, the ring and the propeller blades attached thereto may be mounted on the conical portion of the bow and the stern of the submersible vessel by the use of bevel gears connecting the blade shafts to the crank arm shafts. The crank arm shafts may be attached to the crank arms, the end of which slide about a slot contained within the wobble plate ring. An additional feature of this improvement is the use of a large diameter internal ring drive gear attached to drive the propeller feathering mechanism for propulsion and driven by a small planet gear attached to the plurality of small drive motors. This configuration allows placing the motors near the periphery of the large drive gear and therefore leaves the central portion of the vessel free for the installation of TV cameras and other accessories.

Accordingly, it is the principal object of this invention to provide an improved hydrodynamic control system having a plurality of propeller blades attached to a rotating ring and capable of being feathered in cyclic and collective pitch by virtue of a wobble plate ring supported by a slidable ring having a section of a spherical surface thereon.

Another object of this invention is to provide an improved hydrodynamic control system having a mechanism of greater durability and less lost motion than is known in other devices.

Still another obpect of this invention is to provide a hydrodynamic control system wherein the tandem propeller blade systems are mounted upon the conical bow and conical stern of a submersible vessel.

A further object of this invention is to provide a hydrodynamic control system wherein the wobble plate ring for the feathering mechanism has very limited free play.

Other objects and features of the invention will become apparent to those skilled in art upon reference to the accompanying specifications, claims and drawings in which:

DESCRIPTION OF THE PREFERRED

Figure 1:
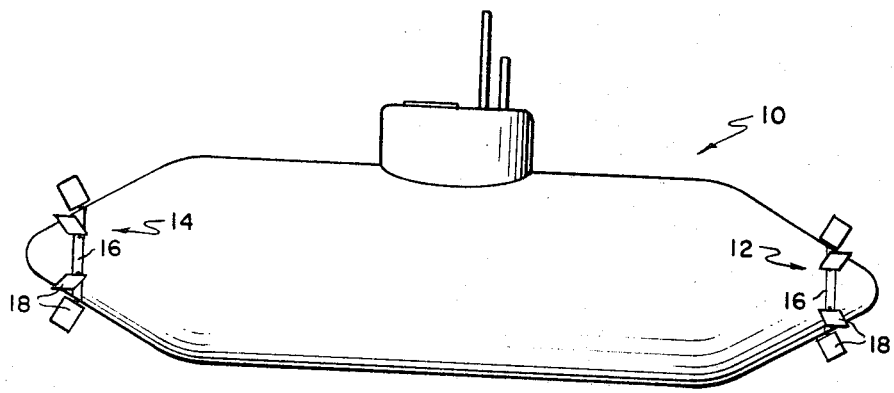
FIG. 1 is an elevation view of a submersible body or submarine showing the ring containing a plurality of propeller blades mounted upon the conical surface of the bow and the stern of the vessel.
Figure 2:
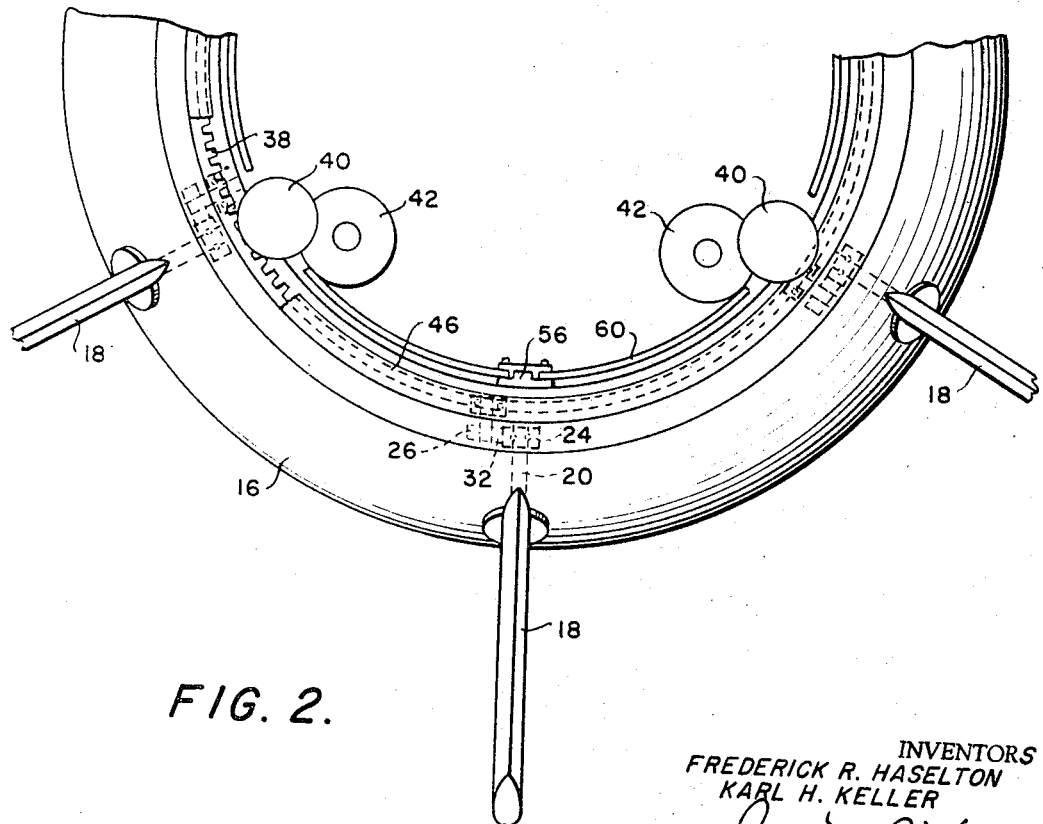
FIG. 2 is a transverse cross-sectional view of the vessel showing the details of the propulsion drive and propeller feathering mechanism.

Referring now to the drawings, wherein like reference numerals refer to like parts, there is shown the submersible vessel 10 of circular cross-section and having fore and aft tandem mounted counter-rotating propelling and control assemblies 12 and 14. Each of the propelling assemblies 12 and 14 comprises a ring 16 having a diameter substantially equal to a cross-sectional diameter of the conical ends of the vessel 10. Pivotally mounted in the rings 16 are propeller blades or vanes 18, the axis of the blades being perpendicular to the conical fore and aft portions of the vessel 10. Each of the blades 18 is equally angularly spaced about the ring 16 and are mounted for pivotal motion on a pivot shaft 20 fixed to each of the blades through a well known spring and ball detent mechanism 22 which permits the propeller blade to break away in rotation when a certain torque is exceeded. A pivot shaft 20 penetrates the ring 16 through an appropriate bearing bore and is fitted with a bevel gear 24 meshed with a larger bevel gear 26. This large bevel gear 26 is mounted upon a crank arm shaft 28 which penetrates, and is mounted for rotation in, an appropriate bearing bore contained in the feathering mechanism support 30. Upon the inner end of the crank arm shaft 28 there is fixedly attached a crank arm 32 having a pin 34 depending therefrom, the head of which is contained in a sliding shoe or in the inner race of a ball bearing 36.

Figure 3:
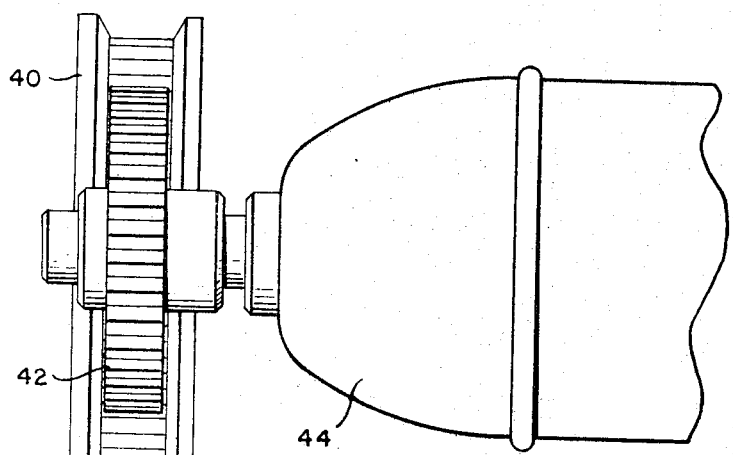
FIG. 3 is a cross-sectional view along the axis of the vessel showing the details of the wobble plate ring, the wobble plate supporting ring, and feathering mechanism.
Figure 3:
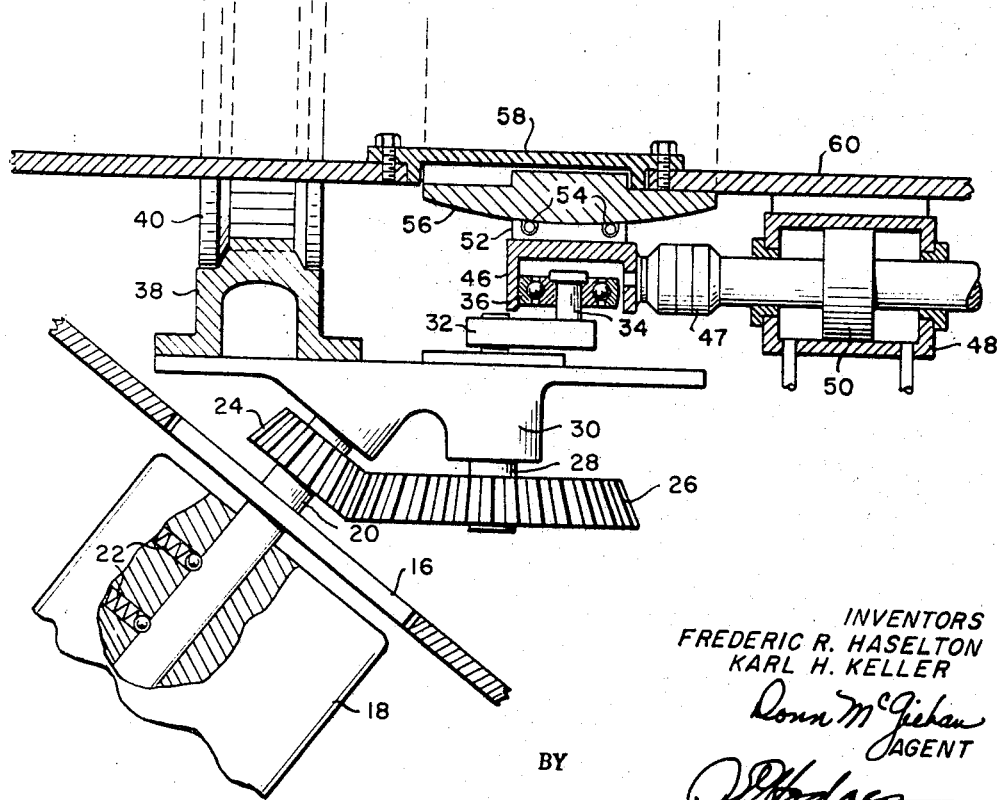

Rotation of the propellers 18 in unison with the ring 16 for propulsion of the vessel is accomplished by an internal ring drive gear 38 fixedly attached to the feathering mechanism support 30. The drive gear 38 having internal teeth and flange is substantially the diameter of the submersible vessel and is maintained in a concentric position and constant pitch line mesh by means of flanged idler gears 40 constraining the internal ring both laterally and transversely, and which are equally angularly spaced about the periphery of the drive gear. As can be seen in FIG. 3, at least three of these flanged idler gears 40 will be required. Meshed with each idler gear 40 there is a pinion gear 42 attached to the shaft of a motor 44. A plurality of small motors 44 are used in this particular application in order to utilize the central portion of the submersible vessel for placement of television cameras and other apparatus so that the vessel may perform its function.

Referring now to FIG. 1, the crank arm bearing 36 is confined by the circular track defined by the U-shaped cross section of a wobble plate ring 46. The wobble plate ring 46 is mounted so that it may be moved fore and aft by action of actuators 48 connected thereto. The actuators 48 have double acting pistons 50. When the wobble plate ring 46 is moved in cyclic (selective) pitch to selectively change the feathering angle of the propeller blades 18, the actuators 48 on one side of the vessel will, for example, push the wobble plate ring 46 forward and actuators 48 on the other side of the vessel will draw the wobble plate ring 46 aftwardly. During this cyclic pitch operation, the bearing pad 52 containing rollers 54 will roll upon the spherical surface of the wobble plate support ring 56. To eliminate binding of the actuator piston 50 a flexible coupling 47 is provided between the wobble plate ring 46 and the piston 50. When a change in collective pitch is required, all of the actuators 48 will either be moved in a fore or aft direction, and the wobble plate support ring 56 will be moved correspondingly fore or aft so that the rollers 54 will remain in the same position on the spherical surface of the support ring 56. This wobble plate support ring 56 may also be considered to be "floating" and will move fore or aft with the bearing support pad 52 and its rollers 54 to maintain proper contact with the spherical surface. The wobble plate support ring 56 is mounted for fore and aft sliding motion on a bearing surface 58 fastened to the inner pressure hull 60. Were it not for the sliding motion of the wobble plate support ring 56 upon its bearing 58, collective pitch would be impossible without binding the rollers 54 against the spherical surface of the support ring 56 and the position of the wobble plate 46 would not be well defined.

It is to be understood that the actuator 48 is shown as a pneumatic or hydraulic type only for illustration and that it may be replaced with a worm screw electric motor drive type actuator.

DESCRIPTION OF THE OPERATION

It can be understood by the description of the preferred embodiment that the pitch of the propeller blades 18 may be controlled collectively or selectively by operating all of the actuators 48 in unison or selectively, respectively, while propulsion assemblies 14 and 16 are rotated about the hull for propulsion. When a collective pitch change is required, for example, to increase forward speed, all actuators 48 will be pushed forward in unison and thus force the wobble plate ring 46 having the form of a hoop with a U-shaped cross section. This movement of the wobble plate 46 will cause the crank arm 32 to be rotated thereby rotating the bevel gears 26 and 24 which ultimately rotated the propeller blades 18. When the wobble plate ring 46 is moved forward without any tilt to the longitudinal axis of the vessel, the wobble plate support ring 56 having a spherical surface will follow by virtue of the bearing contact with the rollers 54 in bearing pad 52 such that proper contact and bearing support will be maintained.

To provide steering effect and motion perpendicular to the longitudinal axis of the vessel, the pitch of the propeller blades 18 may be changed selectively. In this case, no movement of the wobble plate support ring 56 will be required. The wobble plate ring 46 on one side of the vessel will merely roll forward on the spherical surface of the support ring 56 while the wobble plate ring 46 on the other side of the vessel will roll aftwardly on the spherical surface of the support plate 56 and the flexible coupling 58 will be distorted to eliminate any binding of the actuator 48 and piston 50.

Assuming that the vessel is traveling at half speed forward (the blades of each of the propellers being set at an angle intermediate the angle for zero speed, and the angle for full speed) and it is desired to make a turn to starboard, the wobble plate 46 will be moved to a slow speed position on the starboard side while it is moved in a direction toward an increased speed position on the port side thus creating greater propelling force applied to the port side of the vessel to turn it to starboard. If it is desired to turn the vessel to port, greater propelling force is applied to the starboard side of the vessel. To turn the vessel upward the wobble plate is merely adjusted to create a full speed feathering of the propellers on the bottom side of the vessel while the propellers on top side are moved to a slow speed position.

When lateral motion of the vessel is desired to the port side without turning and without fore and aft motion the forward propellers are set to provide the greatest propelling force at the top of the vessel with no thrust at the bottom and the aft propeller assembly is to provide the greatest propelling force at the bottom with no propelling force at the top. As can be seen, this propulsion system provides movement of the vessel in six degrees of freedom.

While the wide range of propeller feathering is provided by this system, it is possible to maneuver the vessel in all directions and the foregoing examples are given to provide mere examples of the many different maneuvers which can be obtained.

The propelling and control structure of the present invention is readily useable for any underwater vehicle such as, for example, a deep submergence vehicle as described herein. Because the interior of the submergence vessel is left relatively unencumbered by mechanism for propulsion and control of the vessel, manipulator arms of well-known construction may be mounted on the end of the vessel, as well as television cameras and other apparatus for use in observing the operation of the manipulator arm is possible.

It should be understood, of course, that the foregoing disclosure relates only to the preferred embodiment of the invention and that numerous modifications or alterations may be made therein without departing from the spirit and the scope of the invention.

What is claimed is:

1. In a hydrodynamic control system for submersible vessels having circumferentially tandem mounted propeller blades at fore and aft positions capable of rotation for propulsion and featherable in pitch for directional control of the vessel, the improvement comprising:
  a whole plate ring having a substantially U-shaped cross section;
  a plurality of rollers angularly spaced about and affixed for rotation to the wobble plate ring;
  a wobble plate bearing and support ring having a segment of a spherical surface in intimate contact with said plurality of rollers and mounted for fore and aft sliding motion; and
  coupling means connecting the wobble plate ring to the propeller blades whereby the propeller blades may be feathered in collective and selective pitch, responsive to longitudinal and tilting movement of said wobble plate ring.

2. The improvement of claim 1 further comprising:
a propeller feathering mechanism support; and
gear drive means attached to said propeller feathering mechanism for rotating the propellers about the periphery of the submersible vessel.

3. The improvement of claim 2 wherein said coupling means comprises:
a crank arm;
a crank pin affixed to one end of said crank arm and engaged in said wobble plate;
a rotatable shaft, one end of which is affixed to the other end of said crank arm;
gear means attached to the other end of said rotatable shaft; and
a propeller blade attached to said gear means.

4. The improvement device of claim 3 wherein said propeller blade is attached by torque transmission limiting means providing free rotation of said propeller blade when it strikes an object.

5. The improvement device of claim 4 wherein the torque transmission limiting means comprises a ball and spring detent mechanism.

6. The improvement device of claim 2 wherein said gear drive means comprises:
a large internal ring gear;
a plurality of equiangularly spaced flanged idler gears meshed with said ring gear and maintaining constant pitch-line mesh;
a spur gear meshed with each of said plurality of idler gears; and
a motor attached to each of said spur gears, thereby providing propulsion power.

7. The improvement device of claim 2 further comprising:
an actuator having a linear motion movable member; and
a flexible coupling attached at one end to said linear motion member and at the other end to said wobble plate ring.

References Cited
UNITED STATES PATENTS 3,101,066   8/1963   Haselton _____ 114—16

TRYGVE M. BLIX, *Primary Examiner.*

U.S. Cl. X.R.

115—35